(12) United States Patent
Soleil et al.

(10) Patent No.: US 11,337,115 B2
(45) Date of Patent: May 17, 2022

(54) SYSTEM AND METHODS FOR REAL-TIME DELIVERY OF SPECIALIZED TELECOMMUNICATIONS SERVICES

(71) Applicant: T-MOBILE USA, INC., Bellevue, WA (US)

(72) Inventors: Alain Soleil, Bellevue, WA (US);
Raymond Wong, Bellevue, WA (US);
Yun-Ling Wang, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 96 days.

(21) Appl. No.: 16/999,712

(22) Filed: Aug. 21, 2020

(65) Prior Publication Data

US 2022/0060943 A1    Feb. 24, 2022

(51) Int. Cl.
*H04W 28/26* (2009.01)
*H04M 15/00* (2006.01)

(52) U.S. Cl.
CPC .......... *H04W 28/26* (2013.01); *H04M 15/60* (2013.01); *H04M 15/8016* (2013.01)

(58) Field of Classification Search
CPC .. H04W 28/26; H04M 15/60; H04M 15/8016
See application file for complete search history.

(56) References Cited

U.S. PATENT DOCUMENTS

| | | | | |
|---|---|---|---|---|
| 6,498,786 | B1 * | 12/2002 | Kirkby | H04Q 3/0066 370/322 |
| 9,055,067 | B1 * | 6/2015 | Ward, Jr. | H04L 12/14 |
| 2003/0012143 | A1 * | 1/2003 | Chen | H04L 67/322 370/252 |
| 2004/0203649 | A1 * | 10/2004 | Cashiola | H04M 15/7655 455/414.1 |
| 2011/0314145 | A1 * | 12/2011 | Raleigh | H04L 43/0882 709/224 |
| 2018/0278495 | A1 * | 9/2018 | Di Cairano-Gilfedder | H04L 41/5096 |

* cited by examiner

*Primary Examiner* — Tejis Daya
(74) *Attorney, Agent, or Firm* — Marshall, Gerstein & Borun LLP

(57) ABSTRACT

A system, method and computer readable storage medium are disclosed to provide dynamic network resource management in a telecommunications network where at least a portion of the network resources are located at an edge of the telecommunications network. The capacity available, the aggregate demand of resources at a given time, and the cost of the network resource demanded as well as each customers upper price limit may be considered and adjusted in real-time by different network resource allocation models.

20 Claims, 4 Drawing Sheets

SYSTEM AND METHODS FOR REAL-TIME DELIVERY OF SPECIALIZED TELECOMMUNICATIONS SERVICES

FIELD OF THE DISCLOSURE

The present disclosure relates to a dynamic, real-time resource allocation and pricing model directed to third parties using edge computing resources in a telecommunications network.

BACKGROUND

In recent years computer networks have seen the growth of centralized cloud computing and also the growth of Internet of Things (IoT) devices. IoT devices have proliferated in a variety of settings to provide industrial, scientific, medical, agricultural, infrastructure, communication, consumer, and other types of data. Some IoT devices measure physical or network conditions at their locations, while other IoT devices receive commands and implement local control functions (e.g., allowing remote operation or optimization of industrial processes or smart devices). Many of these applications require special services of a telecommunications network. Many IOT devices, such as those found in airplanes, drones, automobiles, or public safety devices have very demanding latency requirements. Commercial airplanes, for example, have demanding latency requirements and, in addition, generate large amounts of data. This data far exceeds what can be transmitted by the airplane over a satellite link to a centralized cloud computing system. Latency demands by airplanes or by autonomous vehicles, such as may be used to control steering or braking, is of paramount importance and those latency demands may not be met by a remotely located cloud network. Security and privacy concerns are also growing, such as those arising from the growth of home security systems and home automation devices tied to cloud storage devices. User privacy is at risk when data from home cameras or automation devices is transmitted back and forth from the home to cloud storage devices. These and other use cases have led to the rise of edge computing architecture models, which allows computations, storage and other tasks to be performed at the edge of the network, closer to where the data is generated, in order to address the challenges of latency, bandwidth, security or other concerns. Edge computing resources, however, mean that resources are distributed throughout the network and may be in adequate supply in the aggregate, but be in short supply at any given location, thus creating a need for more careful resource allocation.

SUMMARY

Different use cases in an edge architecture have a wide range of latency, bandwidth and reliability requirements, with different uses requiring different priorities. Some uses require the lowest possible latency, while other applications require a low cost or high security. The emergence of the edge computing architecture and associated uses therefore requires an optimized method for controlling and charging for such diverse services where data is processed closer to the end-user based upon a variety of demands.

The innovation described herein uses automatic resource management to efficiently manage resources of the telecommunications operator. It includes a dynamic, real-time pricing model similar to a double auction model. The model is directed to third party partners (also referred to as "customers" herein) using edge-computing resources, such as for a specialized service on a telecommunications network. The use of an automated model to efficiently manage available network resources avoids the need to manually vet and evaluate different use cases for concern of overloading the network. This innovation further allows for automatic determination of appropriate rents for partners of the telecommunication operator. This could, for example be deployed on a wireless carrier's 5G infrastructure to manage use of network resources, though the innovation is not limited to a 5G network. In the edge computing system architecture, resources of the telecommunication network operator, such as processing units, memory, storage, routing, switching or security services are located at or near the source of the data, such as at the cell site, rather than relying on resources located in a central repository. Edge computing resources, however, mean that resources are distributed throughout the network and may be in short supply at any given location. With an edge architecture, then, it is very possible for an operator to have adequate resources which are deployed inappropriately at the wrong edge of the network, especially in light of changing demand.

Careful and more sophisticated management of these resources is therefore needed and different pricing for these resources is a need which is addressed by a simultaneous double auction model used in this innovation. The model performs automatic resource management, revenue maximization as well as cost minimization for the network operator. This model for resources assumes that demand is dynamic and varies in real time. The supply may also vary based on time of day or type and aggregated quantity of resource demanded. The model also considers the particular network resources that are required (e.g., CPU, Graphics Processing Unit (GPU), storage, security services, etc.), and may also consider: the resources required, the cost to provide the resource, the history of customer requests or the history of resource usage and the customer requested duration of need.

According to an aspect of the techniques described herein, a method for providing dynamic network resource management in a telecommunications network in which at least a portion of the network resources are located at an edge of the telecommunications network may include: obtaining price parameter data in a plurality of customer service level agreements associated with a plurality of customers; determining levels of network resources demanded by each of the plurality of customers based upon current network resource use; generating an aggregate network resource demand function based upon the price parameter data and the levels of network resources demanded; generating a network resource supply function based upon availability of one or more network resources in the telecommunications network; determining an allocation of the network resources based upon the aggregate network resource demand function and the network resource supply function; controlling the network resources to provide services to the plurality of customers according to the allocation; and/or adjusting the allocation in response to changes to current network resource use or changes to the availability of the network resources. The aggregate network resource demand function may indicate types of network resources demanded and locations associated with the demand, and the network resource supply function may indicate the types of the network resources and locations associated with the network resources.

Systems or non-transitory computer-readable storage medium storing executable instructions for implementing all or part of the methods described may also be provided in some aspects. Such systems or computer-readable media may include executable instructions to cause one or more processors to implement part or all of the methods described. Additional or alternative features described herein below may be included in some aspects.

BRIEF DESCRIPTION OF THE DRAWINGS

The figures described below depict various aspects of the applications, methods, and systems disclosed herein. Each figure depicts an embodiment of a particular aspect of the disclosed applications, systems and methods, and that each of the Figures is intended to accord with one or more possible embodiments thereof. Furthermore, wherever possible, the following description refers to the reference numerals included in the following figures, in which features depicted in multiple figures are designated with consistent reference numerals.

DETAILED DESCRIPTION

Figure 1:
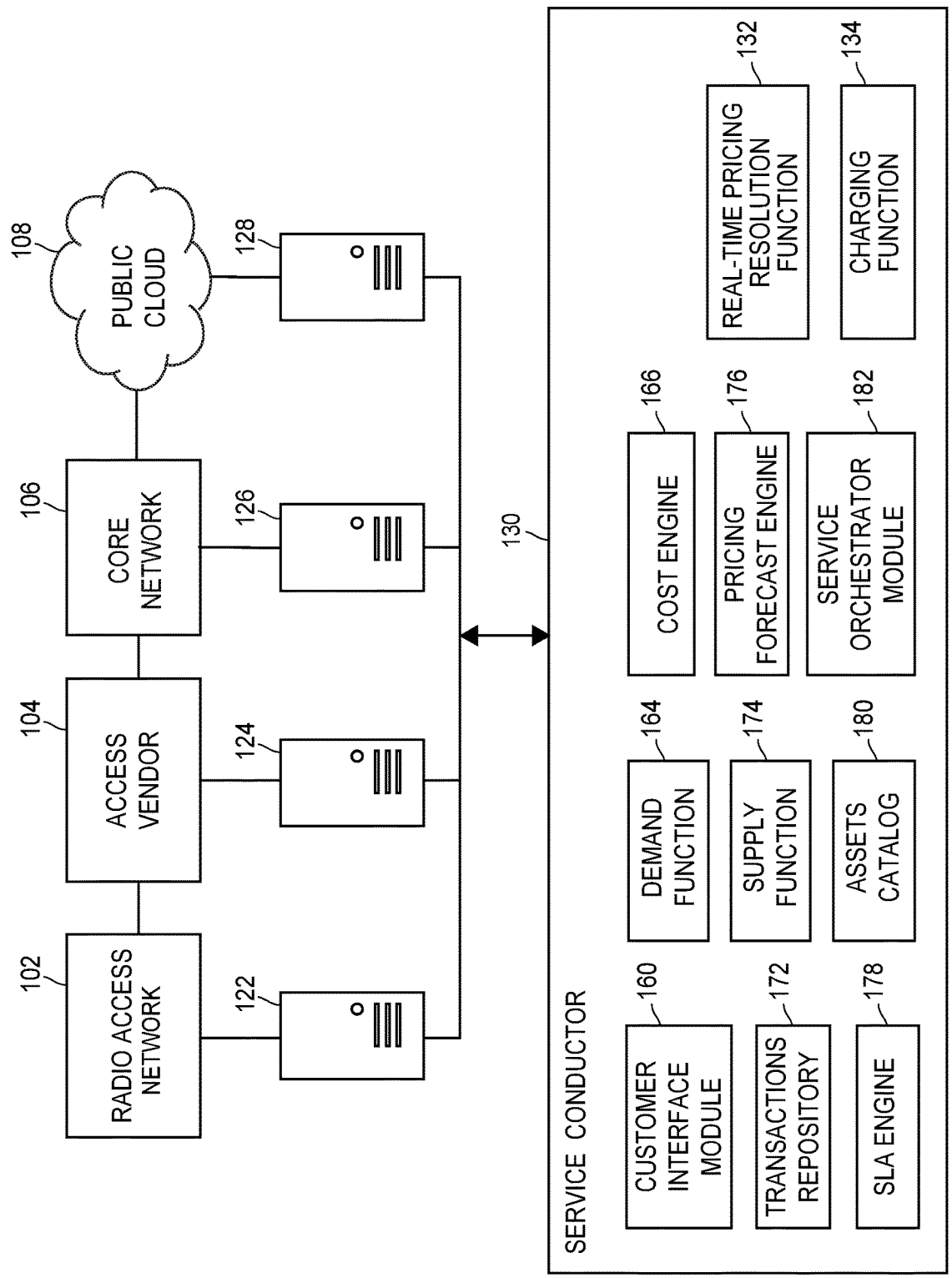
FIG. 1 illustrates a block diagram showing the use of a service conductor component in a wireless edge network.

Edge computing resources can be managed by the systems, methods and devices described herein. FIG. 1 illustrates a block diagram showing an exemplary service conductor 130 configured for use in managing edge resources of a wireless telecommunications network. The service conductor 130 and its subcomponents allocate and track resources across the network in real-time. The service conductor 130 also distributes service requests to available resources across the network based on customer service level agreements (SLAs) or based upon customer input in near real-time. In addition, the service conductor 130 measures and manages compliance with the SLAs.

The service conductor 130 is connected to various components of the network via one or more router devices. Each of the router devices 122, 124, 126, 128 (which may be referred to herein as a "router") may be a router, a server that also performs a routing function, a data switch or a data hub. In the exemplary embodiment illustrated in FIG. 1, the service conductor 130 is connected via one or more router devices 122 to radio access network (RAN) 102, which may be required for a 3G, 4G or a 5G radio network. The service conductor 130 is connected via a router device 124 to one or more alternative access vendors 104. These alternative access vendors 104 control all or a portion of the backhaul capacity of the network with capability to expand or contract as needed. The service conductor 130 is also connected via one or more router devices 126 to the core network 106. On a 4G network, this core network connection might include connectivity to the Home Subscriber Server (HSS) or the Packet Gateway (PGW). On a 5G network, the core network includes the Access and Mobility Management Function (AMF) and the User Plane Function (UPF), which may be configured to provide information about the network to the service conductor 130 deployed in a 5G network. The service conductor 130 as shown in FIG. 1 also has connectivity to Public Cloud 108 via one or more router devices 128.

As further illustrated in FIG. 1, the service conductor 130 contains multiple modules. The modules may be software applications, routines, or components stored in a computer readable memory. All modules may be executed on the same processor, by multiple processors on the same server, or may be executed by multiple processors and multiple servers in a network configuration. Those with skill in the art will recognize that all or a portion of the modules may be combined with each other.

The service conductor 130 contains a customer interface module 160, which accepts input from customers or customer applications wanting to use one or more of the network resources. The input may be accepted electronically from the customer via use of an application programming interface (API) or accepted via a human interface. Besides the resource needed, this input from customer interface module 160 may include SLAs for the various customers which are managed by the SLA engine 178. The SLA for a customer may include price parameter data and may further contain payment commitments such as maximum price willing to be paid by the customer per unit of a particular resource, per unit of time, or maximum price in total for all resources, as well as other guidance. The customer interface module 160 also may receive other input, such as a duration of need or allowable latency.

The service conductor 130 may further include a demand function 164 relating to network resource utilization, particularly for edge resources of the network. The demand function 164 aggregates resource requests and associated willingness to pay from all customers for such services and collates the requests across a time domain to generate a demand function across a time domain. The demand function 164 then sends the aggregated demand across time domain to the real-time pricing resolution function 132 as one of the two inputs. Another input of the real-time pricing resolution function 132 comes from the supply function 174 where it takes inputs from the assets catalog 180 and from the SLA engine 178 as well as the cost engine 166. Also illustrated is a supply function 174 which takes input from assets catalog 180 and from the SLA engine 178 and sends output to a real-time pricing resolution function. The supply function 174 determines, using any of several resource allocation models, the most cost effective way to meet different levels of resource requirements at any given time. The supply function 174 accepts inputs from the asset catalog 180, SLA engine 178, and cost engine 166 and sends output to the real-time pricing resolution function 132. The real-time pricing resolution function performs real-time price determination based on previously described inputs from the demand function 164 and the supply function 174. After the price is resolved, the service orchestrator module 182 coordinates with the network resources (such as radio access network 102 alternative access vendor 104 core network 106 and Public Cloud 108) to fulfill and execute service requests. The charging function 134 charges customers for services that have been fulfilled. In some embodiments the charging function may connect back to customer interface module 160 in order to give immediate electronic presentation of the charge or it may simply send output to the operator's billing system.

Also illustrated is the pricing forecast engine 176 of the service conductor 130, which may accept input from the cost engine 166 which provides, among other things, a cost floor. The pricing forecast engine 176 may, in some embodiments, accept input from a real-time pricing resolution function. Artificial intelligence and machine learning techniques may also be used in this module to predict, in advance, customer needs and/or pricing predictions which are then provided to the customer interface module 160 regarding the predicted price of the resource at the time the resource is needed. The predicted price may be based upon the time of day, based upon the day of the week, based upon the availability of one or more network resources, based upon the aggregate demand of resources at the time, or based upon the cost of the network resource demanded, as well as each customer's upper price limit. The pricing forecast engine may, for example, discount or add a premium to the cost based upon the time of day, the anticipated demand by other customers, or a variety of other factors. For example, a customer demand for low latency processing during an operator's highest-demand time periods would be expected to require a higher price for the third party customer using the service than the same demand during off hours, which might be priced at a discount. The history or "reputation" of a particular customer may also be considered if a particular customer consistently underestimates or consistently overestimates the amount of resources required. In a similar fashion, the history of a particular network resource usage may also be considered if a plurality of customers have a tendency to consistently overestimate or underestimate need for that particular resource. In one embodiment, the pricing forecast is provided to the customer via the customer interface module 160 for approval prior to services being used by the customer.

Figure 2:
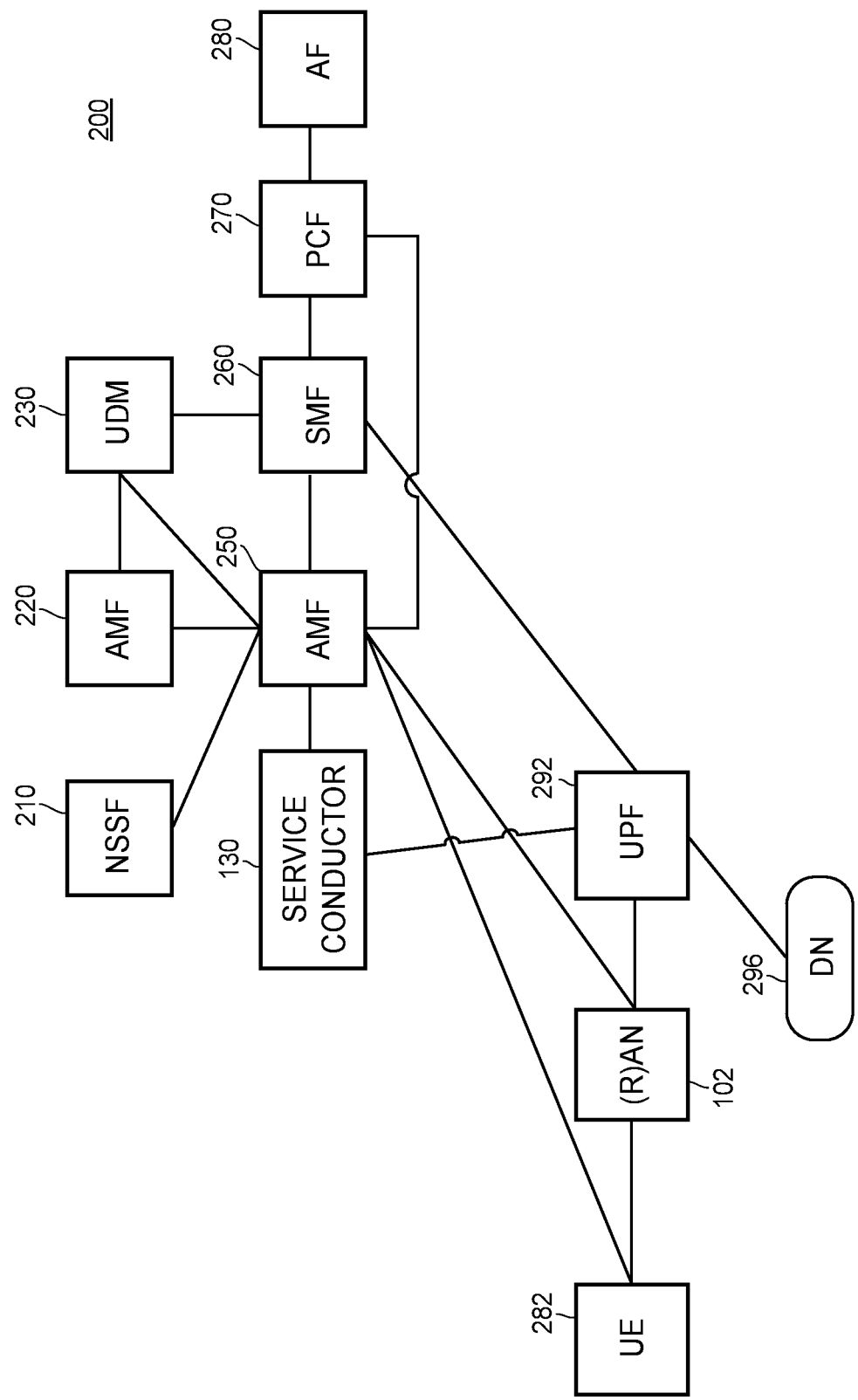
FIG. 2 illustrates a block diagram showing the use of a service conductor attached to the components of 3GPP 5G wireless network.

FIG. 2 illustrates a block diagram showing the service conductor 130 in a 5G wireless network. It should be noted that this represents an exemplary embodiment, and the service conductor 130 is not limited to use in a 5G network. In this 5G embodiment, the service conductor 130 is connected to the access and mobility management function (AMF) 250 to obtain mobility and session information, especially mobility information for the user equipment (UE) 282. The policy control function (PCF) 270 and the session management function (SMF) 260, as well as the application function (AF) 280, can also be accessed by the service conductor 130 through the AMF 250. The 3GPP elements of the network slice selection services function module (NSSF) 210, the authentication server function (AUSF) 220 and the unified data management module (UDM) 230 are also connected to the AMF 250. In the 5G embodiment of this invention, the service conductor 130 may also be connected to the user plane function (UPF) 292. This connection can be used by service conductor 130 to gain access to the data network (DN) 296. Also shown on the diagram is the radio access network (RAN) 102 which connects the UE 282 to the 5G network.

In a 4G cellular network embodiment of this invention, not shown, the service conductor 130 may manage the resources of a 4G network by connecting to the Home Subscriber Server (HSS), where the service conductor 130 obtains UE mobility information. The service conductor 130 may also have a connection to the Packet Data Network Gateway (PGW) element where the service conductor 130 can gain access to the 4G data network.

Figure 3:
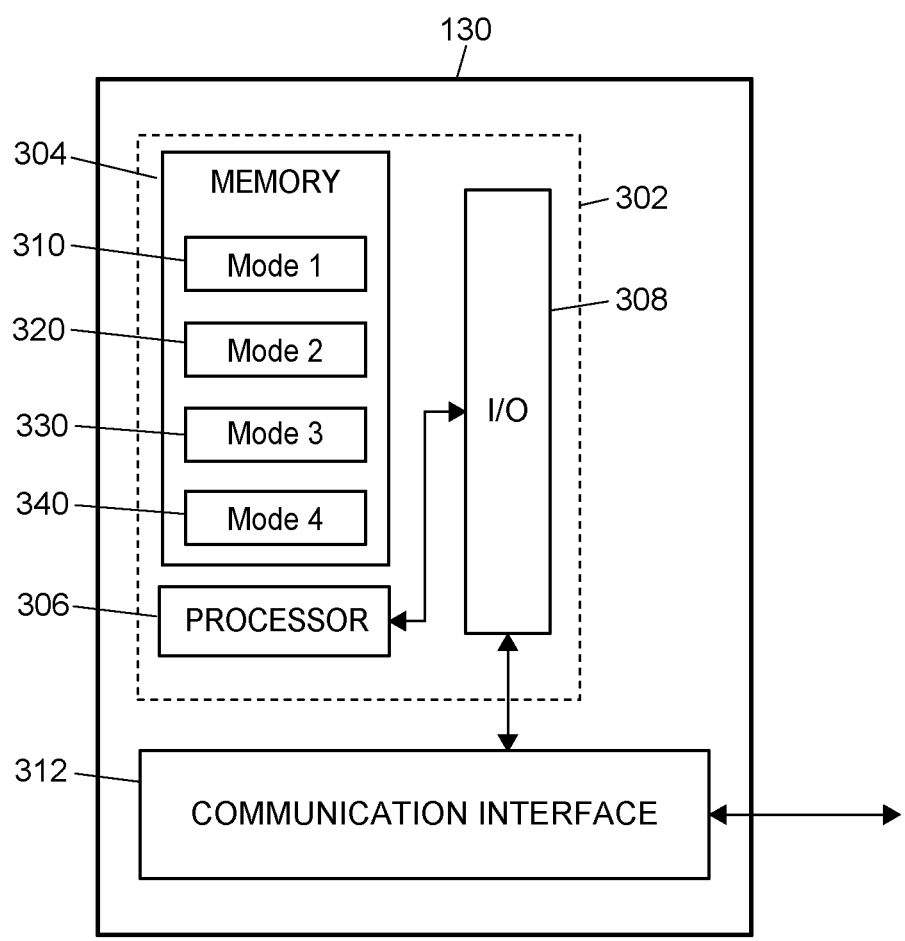
FIG. 3 illustrates a block diagram of an exemplary service conductor, including different modes of a dynamic pricing model contained in the memory of the service conductor.

Moving next to FIG. 3, a block diagram of the service conductor 130 is illustrated, showing various components thereof. In this exemplary embodiment, the service conductor 130 contains a controller 302, and the controller contains one or more processors 306 an input/output (I/O) controller 308 and a memory 304. The components of the controller 302 may be interconnected via an address/data bus or other means. The components may all be contained in one service conductor 130 (e.g., in one server operating as the service conductor 130) or may be distributed in a networked fashion across multiple computing devices or systems (e.g., distributed across multiple servers interconnected and configured to operate collectively as the service conductor 130). Although FIG. 3 depicts only one processor 306, the controller 302 may include multiple processors 306 in some embodiments. The memory 304 may comprise random access memory (RAM) and/or nonvolatile memory such as NVRAM, read only memory (ROM), flash memory, electrically erasable programmable ROM (EEPROM), or magnetic media such as a hard drive. The processor 306 may comprise one or more microprocessors including a graphics or floating point processor. The controller 302 also includes the input/output controller 308. The input/output controller 308 is connected to the communication interface 312. The communication interface 312 is connected to external elements such as the access and mobility management function 250 or a user plane function 292 element of a 5G network or the communication interface 312 may connect to the HSS or PGW of a 4G network.

The memory 304 contains non-transitory computer readable executable instructions, which, when executed by a processor support at least one of four modes of network resource management. These four modes include Mode 1 (block 310), in which the network resources are assigned on a one-to-one exclusive basis to customers. Mode 1 implies that if a resource is allocated to a customer, it cannot be used by another customer even if the resource is not being fully utilized. Mode 2 (block 320) oversubscribes network resource allocation from a shared pool of resources with an allocation cap and a priority assigned to each customer. Mode 3 (block 330) also oversubscribes network resources from a shared pool with a priority assigned to each customer, may use an aggregate customer resource cap, but with no allocation caps to each customer. Mode 4 (block 340) is a hybrid of Modes 1, 2 and 3. In one embodiment, Mode 1 would be appropriate for a group of customers paying for a premium level service level agreement. Mode 2 might be used in another embodiment where all customers are charged equivalently and the operator needs to tightly manage resources. Mode 4 might be used to support both a subset of premium customers that have guaranteed service agreements (and assigned resources similar to Mode 1) and a simultaneous set of customers at the same operator at standard rates with resources assigned to the remainder of the resources similar to Mode 2 or Mode 3. A portion of the memory 304 may also be required and referenced by a processor 306.

Figure 4:
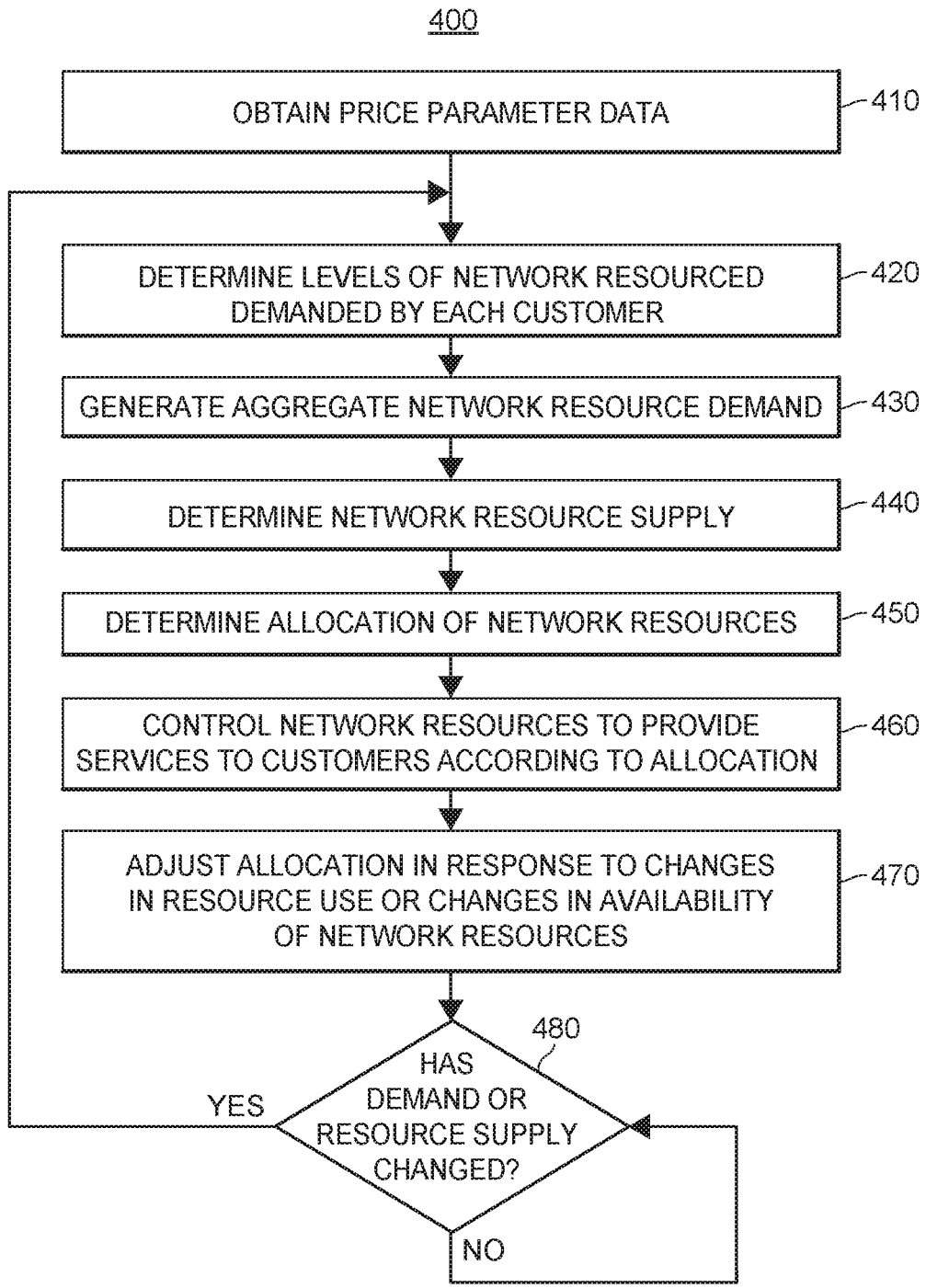
FIG. 4 illustrates a flow diagram of an exemplary method to implement the dynamic real-time model.

FIG. 4 illustrates a flow diagram of an exemplary resource allocation method 400 to implement the dynamic real-time model to allocate network resources. The resource allocation method 400 may be implemented by the service conductor 130 described above to control the allocation of limited network resources (particularly edge resources) in a wireless telecommunications network, as described above. In various embodiments, parts of the resource allocation method 400 may be implemented by various modules of the service conductor 130 or by such modules in various combinations. To ensure the allocation of resources remains optimal as demand and network conditions change over time, the resource allocation method 400 (or parts thereof) may be repeated on an ongoing basis or on a periodic basis with short intervals between reallocation (e.g., every thirty seconds or every five minutes).

In block 410, the service conductor 130 obtains price parameter data. Price parameter profile data contained in customer SLAs, may be obtained on a one-time basis for each customer, or updated periodically. The SLA might indicate the total cost willing to be paid by each customer, the price per service for a particular service for each customer, the price per unit of time for the service, or a location associated with the demand from the customer. This pricing data might also come from inputs from an API connecting to the customer interface module 160 portion of the service conductor 130 or from the customer SLA containing a price profile or price parameter data which may further indicate a customer payment commitment. The commitment to pay for a network resource may be based on maximum price per unit of resource, a payment commitment per unit of time, or payment commitment for a total charge. The pricing data may also come from a cost engine used to determine a price floor where a multiplier is further applied by the operator (e.g., a multiplier of 1.15 to generate a fifteen percent margin). The pricing data may alternately be determined from a pricing forecast engine that uses artificial intelligence and machine learning to forecast prices, which may be approved in real-time by the customer, or from a combination of sources. The pricing forecast engine may use historical pricing and resource usage data to predict one or more of the following: expected demand for one or more network resources, expected network resource availability, or optimal pricing for market-clearing network resource allocation.

In block 420, the service conductor 130 then determines the level of network resources demanded by each customer and an estimated period of time the resource is needed. Such network resource demand may be price-dependent (e.g., a demand profile), as well as being dependent upon service parameters (e.g., latency, reliability, or peak usage). A network resource demand profile may thus be generated to indicate types, locations, and parameters (e.g., time, service parameters, total usage) associated with network resource demand, particularly for edge resources that may be more location-dependent. For example, an application that controls vehicle braking may demand nearby resources with the lowest latency and highest network usage. In a network limited by throughput of satellite links, an application may request resources on the application side of the satellite link or may request less costly (but slower) storage in another part of the network. In another example, a fall detection sensor for a person requires low latency and also relatively low network resources. In a third example, in an agricultural environment, farm equipment operating in the field and utilizing machine vision to identify plant types for appropriate action, may require low latency as well as relatively heavy usage from network resources.

In block 430 of this method, the resources from particular customers are aggregated by a demand function 164 in order to determine the total resource demand on the network. This aggregation can be collated across a time domain or other parameters, such as location. This aggregate network resource demand function indicates aggregate demand for one or more types of network resources by price and at least one other parameter, such as time, quality, or location. In block 440, the service conductor 130 determines the resource supply. This may be from supply function 174, which may use the assets catalog 180, cost engine 166, as well as one of the network resource models 310, 320, 330, or 340. In some embodiments, the network resource supply function may be determined based upon real-time availability data regarding the network resources, which may include information concerning resource utilization or operating status (e.g., resource operating health, such as whether any error conditions are limiting or preventing operation of particular network resources).

In block 450, network resources are allocated to the customers based upon the aggregate demand and the aggregate supply. The network resource models 310, 320, 330, or 340 are used by the service conductor 130 to determine the most economical and efficient network resources in block 440 to meet the aggregate customer resource demand. The supply function also feeds information to a real-time pricing resolution function 132, which resolves pricing based upon supply and aggregate demand in a dual auction fashion. The real-time pricing resolution function outputs to a charging function. The charging function charges customers when services are fulfilled. In some embodiments, this function may transmit data to the customer interface module 160. In some embodiments, specific network resources are assigned to particular customers. When the resources are assigned for use, the transaction may be recorded in a transaction repository 172, which may in some embodiments also contain a "reputation score" change for the customer, and the assets catalog 180 may also then be updated with the information regarding the resource being used. Alternatively, actual resource use levels by the customers may be monitored and recorded.

In block 460, the network resources are controlled by a service orchestrator module 182 of the service conductor 130 according to the model selected (such as models 310, 320, 330, 340) and according to each customer's determined resource allocation. The service orchestrator 130 coordinates with various elements (which may include alternative access vendors 104, core network 106 elements, and Public Cloud 108 elements) to provide service and fulfill the customer demand. After determining, an allocation of the network resources based upon the aggregate network resource demand function and the network resource supply function, the real-time pricing resolution function further adjusts the allocation in block 470 in response to changes based upon current network resource use or changes based upon availability of one or more network resources. This method 400 monitors the network at block 480 for changes in demand or changes in network resource supply. If a change has occurred in either supply (such as a network resource going out of service) or a change has occurred to demand such as when more applications now need the network resource, the method 400 loops from 480 back to block 420.

In some embodiments, the service conductor 130 provides a pricing prediction for each customer based upon the level of network resources demanded, the customer service level agreement, the supply of the resource, an aggregate resources demanded, and the duration of need. This prediction may be presented to the customer via customer interface module 160. The pricing prediction may be adjusted based upon actual levels of network resources used by each of the customers to determine the pricing prediction for each customer. Past history of the particular customer may also be considered in the pricing prediction, through machine learning or other means. Machine learning, for example, may be used to adjust for some customers that may consistently underestimate or overestimate their resource need. Alternately, some resources may consistently be over or underestimated by all customers as may be determined by comparing the SLA engine 178 or the demand function 164 to the transaction repository 172 on a per customer basis or on a per resource used basis.

Although individual operations of one or more methods are illustrated and described as separate operations, one or more of the individual operations may be performed concurrently, and nothing requires that the operations be performed in the order illustrated. Structures and components functionality presented as separate components in example configurations may be implemented as a combined structure or component. Similarly, functionality of structures and components presented as a single component may be implemented as separate components. These and other variations, modifications, additions, and improvements fall within the scope of the subject matter herein.

As used herein, the term non-transitory computer-readable storage medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed:

1. A method to provide dynamic network resource management in a telecommunications network, comprising:
   obtaining, by one or more processors, price parameter data in a plurality of customer service level agreements associated with a plurality of customers;
   determining, by the one or more processors, levels of network resources demanded by each of the plurality of customers based upon current network resource use;
   generating, by the one or more processors, an aggregate network resource demand function based upon the price parameter data and the levels of network resources demanded, the aggregate network resource demand function indicating types of network resources demanded and locations associated with the demand;
   generating, by the one or more processors, a network resource supply function based upon availability of one or more network resources in the telecommunications network, wherein the network resource supply function indicates the types of the network resources and locations associated with the network resources;
   determining, by the one or more processors, an allocation of the network resources based upon the aggregate network resource demand function and the network resource supply function;
   controlling, by the one or more processors, the network resources to provide services to the plurality of customers according to the allocation; and
   adjusting, by the one or more processors, the allocation in response to changes to current network resource use or changes to the availability of the network resources.

2. The method of claim 1, wherein at least a portion of the network resources are located at an edge of the telecommunications network.

3. The method of claim 1, wherein controlling the network resources according to the allocation includes assigning at least a portion of the network resources on an exclusive basis to at least one of the customers.

4. The method of claim 1, wherein controlling the network resources according to the allocation includes oversubscribing at least a portion of the network resources to customers from a shared pool of resources, with the customers assigned a priority in the shared pool and with the shared pool of resources having an aggregate customer resource cap.

5. The method of claim 1, wherein controlling the network resources according to the allocation includes oversubscribing at least a portion of the network resources assigned to a shared pool of resources, with each customer assigned a priority in the shared pool and each customer assigned a resource cap.

6. The method of claim 1, further comprising:
   determining, by one or more processors, a duration of need for each network resource by each customer,
   wherein the allocation of the network resources is further based upon the duration of need for each network and each customer.

7. The method of claim 6, further comprising:
   providing, by the one or more processors, a pricing prediction for each customer based upon the level of network resources demanded, the customer service level agreement, a supply of the resource, an aggregate resources demand, and the duration of need;
   recording, in a repository, the levels of network resources demanded by each customer; and
   adjusting, by the one or more processors, the pricing prediction based upon actual levels of network resources used by each of the plurality of customers to determine the pricing prediction for each customer.

8. The method of claim 7, wherein the service level agreement associated with the customers include payment commitments for network resources based upon the pricing predictions.

9. The method of claim 8, wherein the payment commitment includes: committing based on a unit of time, committing based on a unit of resource, or committing based on total charge.

10. A non-transitory computer-readable storage medium storing executable instructions that, when executed by one or more processors, cause the processors to:
    obtain price parameter data in a plurality of customer service level agreements associated with a plurality of customers;
    determine levels of network resources demanded by each of the plurality of customers based upon current network resource use;
    generate an aggregate network resource demand function based upon the price parameter data, the levels of network resources demanded, types of network resources demanded and locations associated with the demand;
    generate a network resource supply function based upon availability of one or more network resources in a telecommunications network, the network resource supply function indicating the types of the network resources and locations associated with the network resources;

determine an allocation of the network resources based upon the aggregate network resource demand function and the network resource supply function;

control the network resources to provide services to the plurality of customers according to the allocation; and adjust the allocation in response to changes to current network resource use or changes to the availability of the network resources.

11. The non-transitory computer-readable storage medium of claim 10, wherein controlling the network resources according to the allocation includes assigning at least a portion of the network resources on an exclusive basis to at least one of the customers.

12. The non-transitory computer-readable storage medium of claim 10, wherein controlling the network resources according to the allocation includes oversubscribing at least a portion of the network resources to customers from a shared pool of resources, with the customers assigned a priority in the shared pool and with the shared pool of resources having an aggregate customer resource cap.

13. The non-transitory computer-readable storage medium of claim 10, wherein controlling the network resources according to the allocation includes oversubscribing at least a portion of the network resources assigned to a shared pool of resources, with each customer assigned a priority in the shared pool and each customer assigned a resource cap.

14. The non-transitory computer-readable storage medium of claim 10, wherein controlling the network resources according to the allocation includes oversubscribing at least a portion of the network resources assigned to a shared pool of resources, with each customer assigned a priority in the shared pool and each customer assigned a resource cap.

15. The non-transitory computer-readable storage medium of claim 10, wherein the executable instructions further cause the processors to:

determine a duration of need for each network resource by each customer, wherein the allocation of the network resources is further based upon the duration of need for each network and each customer.

16. A system for providing dynamic network resource management in a telecommunications network having at least a portion of the network resources located at an edge of the telecommunications network, comprising:

one or more processors;

a program memory storing executable instructions that, when executed by the one or more processors, cause the system to:

obtain price parameter data in a plurality of customer service level agreements associated with a plurality of customers;

determine levels of network resources demanded by each of the plurality of customers based upon current network resource use;

generate an aggregate network resource demand function based upon the price parameter data, the levels of network resources demanded, types of network resources demanded and locations associated with the demand are indicated;

generate a network resource supply function based upon availability of one or more network resources in the telecommunications network, the network resource supply function indicating the types of the network resources and locations associated with the network resources;

determine an allocation of the network resources based upon the aggregate network resource demand function and the network resource supply function;

control the network resources to provide services to the plurality of customers according to the allocation; and adjust the allocation in response to changes to current network resource use or changes to the availability of the network resources.

17. The system of claim 16, wherein the executable instructions that cause the system to control the network resources according to the allocation cause the system to assigning at least a portion of the network resources on an exclusive basis to customers.

18. The system of claim 16, wherein the executable instructions that cause the system to control the network resources according to the allocation cause the system to oversubscribe at least a portion of the network resources to customers from a shared pool of resources, with the customers assigned a priority in the shared pool and with the shared pool of resources having an aggregate customer resource cap.

19. The system of claim 16 wherein the executable instructions that cause the system to control the network resources according to the allocation cause the system to oversubscribe at least a portion of the network resources assigned to a shared pool of resources, with each customer assigned a priority in the shared pool and each customer assigned a resource cap.

20. The system of claim 19, wherein the executable instructions further cause the system to:

provide a pricing prediction for each customer based upon the level of network resources demanded, the customer service level agreements, the supply of the resource, an aggregate resources demanded, and a duration of need;

record the levels of network resources demanded by each customer in a repository; and adjust the pricing prediction based upon actual levels of network resources used by each of the plurality of customers to determine the pricing prediction for each customer.

* * * * *